United States Patent [19]

Pessina et al.

[11] 4,075,896

[45] Feb. 28, 1978

[54] MECHANISM FOR THE VARIABLE-SPEED DRIVE OF THE AUTOMATIC SHEET FEEDER DRUM

[76] Inventors: Giorgio Pessina; Aldo Euclide Perobelli, both of Via Arborina 2, Paderno Dugnano, Italy

[21] Appl. No.: 661,014

[22] Filed: Feb. 24, 1976

[30] Foreign Application Priority Data

Mar. 3, 1975 Italy ........................................ 20849/75

[51] Int. Cl.[2] ............................................ F16H 21/14

[52] U.S. Cl. ............................................ 74/69; 270/70

[58] Field of Search ............................... 74/69; 270/70

[56] References Cited

U.S. PATENT DOCUMENTS

| | | | |
|---|---|---|---|
| 273,509 | 3/1883 | Glass et al. | 74/69 |
| 379,971 | 3/1888 | Miller | 74/69 |
| 954,087 | 4/1910 | Goss | 270/70 |
| 959,354 | 5/1910 | Klinck | 270/70 |
| 1,413,841 | 4/1922 | Fallot | 270/70 |
| 2,284,675 | 6/1942 | Nalbach | 74/69 |
| 3,530,731 | 9/1970 | Koch et al. | 74/69 |

*Primary Examiner*—Benjamin W. Wyche
*Assistant Examiner*—Wesley S. Ratliff, Jr.
*Attorney, Agent, or Firm*—Kirschstein, Kirschstein, Ottinger, Frank & Cobrin

[57] ABSTRACT

The present invention relates to a variable-speed drive mechanism for the drum of an automatic sheet feeder.

It is known that the collators for signatures and single sheets are provided with so-called automatic feeders which collate the material arranged in a pile on a collating table.

In modern machines each feeder is provided with an aspirator for removing the lower sheet from the pile so that it can be gripped by the grippers fitted to each rotating drum. In the moment in which the sheet lifted by the aspirators is gripped by the grippers, the drum must stop to allow the perfect gripping of the single sheet.

Drawbacks of the known types of automatic feeder are that the number of extracted sheets is limited, that, because of the interruption of the motion of the drum carrying the grippers, the performance of similar feeders is not quite satisfactory, that there are considerable acceleration forces which cause a rather heavy wear of the mechanical components, and that the automatic feeders of this type when operating, are rather noisy.

3 Claims, 5 Drawing Figures

MECHANISM FOR THE VARIABLE-SPEED DRIVE OF THE AUTOMATIC SHEET FEEDER DRUM

BACKGROUND AND SUMMARY OF THE INVENTION

It is the object of this invention to propose a simple feeder drive mechanism which allows to obviate the drawbacks of the preceding state of the art, a mechanism which makes it unnecessary to stop the rotating drum during the single-sheet gripping phase, ensuring thus that at the moment of gripping the single sheet, the drum together with the grippers rotates at a minimum speed which, after the sure gripping of the sheet, is again accelerated to the maximum speed until the next sheet gripping phase is reached.

The said object is reached according to this invention by driving the gripper-carrying drum with a mechanism having a rotating guide component provided with a longitudinal groove with a roller, slidingly seated in this groove, near the circumference of a revolving disk and connected to a shaft controlling the motion of the drum and with the center of rotation of the said disk being displaced with respect to the centre of rotation of the driving shaft of the grooved component.

With a similar mechanism for controlling the action of the respective gripper drums of an automatic feeder, the speed of the revolving drum is brought by simple and secure means from a minimum (during the sheet gripping phase) to a maximum, followed by a new slowing-down phase, without any abrupt stoppage.

The mechanism according to this invention will now be described in detail with reference to a preferred embodiment thereof given by way of example without being limited thereto, and on hand of the accompanying drawings, in which:

DESCRIPTION OF THE PREFERRED EMBODIMENT

Figure 1:
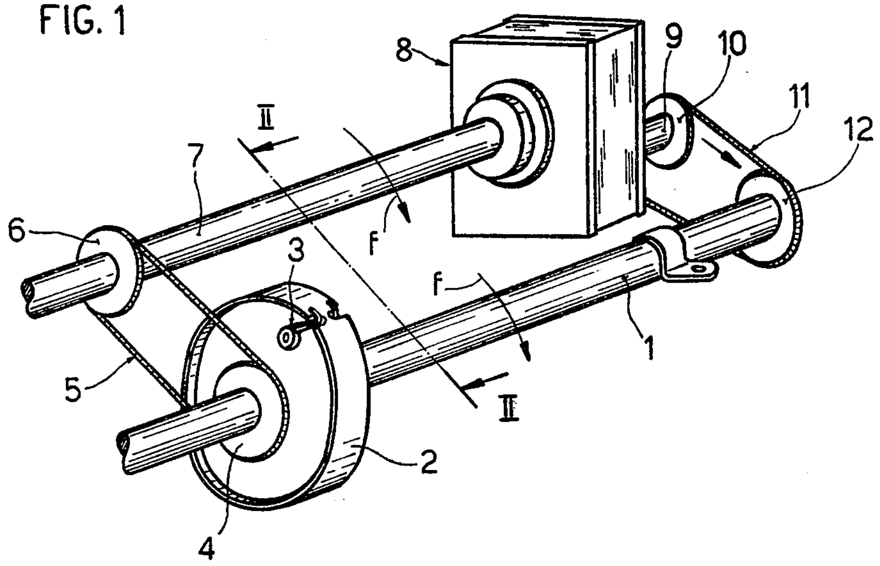
FIG. 1 is a schematic perspective view of the variable speed drive mechanism for the gripper-carrying drum.

As shown in FIG. 1, a shaft 1 carries in neutral a drum 2 provided with grippers 3 for gripping a sheet in a machine provided with an automatic feeder. The structural components of such a feeder being generally known and having nothing to do with this invention, their graphical illustration and their description is here omitted.

Integral part of the drum 2 is a disk 4 which may be a chain wheel or similar device. The said disk engages a chain or belt 5 driven by a corresponding disk 6 integrally fixed to a revolving shaft 7 parallel to shaft 1 and driven by a mechanism indicated with 8. The motion is transferred to the mechanism 8 by means of an inlet shaft 9 carrying a chain or similar wheel 10. A chain 11 then transmits the motion to the shaft 9 and, at the same time, through a further gear wheel 12 or similar to the shaft 1. Therefore, the shafts 1 and 7 rotate in the direction indicated by the arrow *f*.

Figure 2:
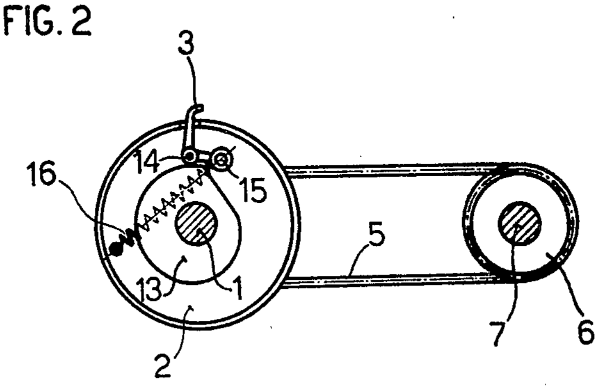
FIG. 2 is a section along line II—II of FIG. 1.

The sheet grippers 3, as shown in FIG. 2, are driven by a cam 13 integral part of the shaft 1. During the rotation of the shaft 1 the said cam 13 controls the movement of the grippers 3 always present in pairs. The said grippers are hook-like and allowed to oscillate around the pin 14. To ensure that the tracer roller 15 of the corresponding gripper remains always in close contact with the surface of the cam 13, the said gripper 3 is kept under tension by a return spring 16.

Figure 3:
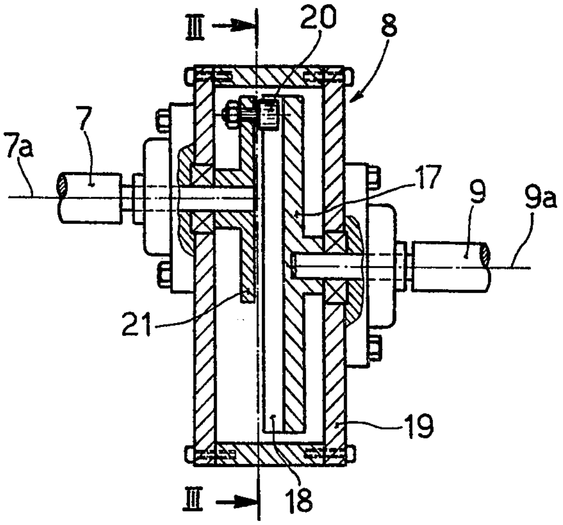
FIG. 3 is a cross-section through the drive mechanism according to this process.

The mechanism 8 shown in FIG. 3 in longitudinal section, comprises a guide component 17, rotating, fitted with a longitudinal groove 16. The said element 17 is integrally fixed to the end of shaft 9 projecting into the inside of the body 19 of the mechanism 8. The groove 18 engages a roller 20 fixed near the circumference of a disk 21. The said disk 21 is rotatingly supported by the end of shaft 7 projecting inside the body 19 and driving the drum 2. The axis of rotation 7*a* of the disk 21 is displaced with respect to the axis of rotation 9*a* of the element 17 provided with the groove 18.

This particular arrangement and the genial combination between a rotating element 17 having a groove 18 which allows to rotate by means of a sliding roller a disk, it is possible to vary the speed of the shaft 7 from a maximum value (FIG. 4) to a minimum value (FIG. 5), the said speed variation being steplessly-variable and without any abrupt interruptions. The same effect could be also obtained by means of elliptic gears.

Figure 4:
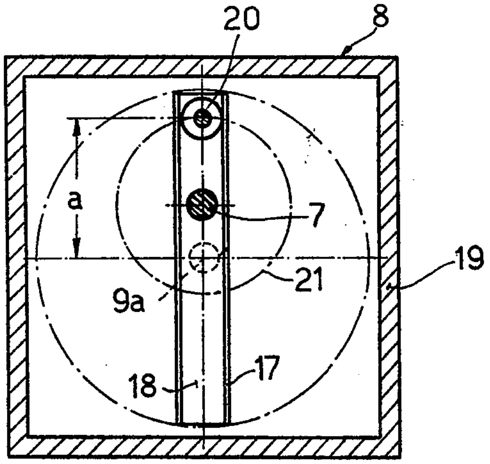
FIG. 4 is a section along line III—III of FIG. 3 with the drive mechanism in maximum speed position.

As shown in FIG. 4, the distance (*a*) between the center of the roller 20 and the center of rotation 9*a* of shaft 9 driving the element 17 is now at a maximum so that the speed of rotation of shaft 7 of the disk 21, in this position, has now an analogous maximum value.

Figure 5:
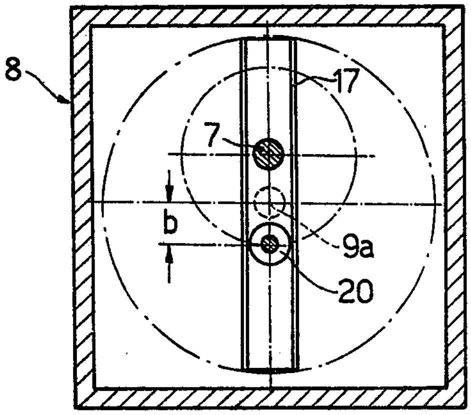
FIG. 5 is a section through the mechanism of FIG. 4 but in minimum drum speed position.

FIG. 5 shows that, after the element has turned through 180°, the distance (*b*) between the center of the roller 20 and the center 9*a* of shaft 9 driving the said element 17 arrives at a minimum value, so that also the speed of rotation of the shaft 7 has now a minimum value.

With such a genial mechanism 8, at the same time quite simple, is it possible to drive the drum 2 together with the grippers 3 of a automatic sheet feeder at a speed varying from a maximum value to a minimum one. The passage from maximum to minimum speed is stepless and without any abrupt accelerations or decelerations as will happen for example when the drum 2 is stopped during the sheet gripping phase.

What we claim is:

1. In an automatic sheet feeder, the combination of:

A. a feed drum,

B. grippers carried by the drum and shiftable between a sheet releasing idle position and a sheet gripping operative position, C. means mounting the drum for rotation about its center, D. means rotatably driving said drum at a speed that varies continuously between a maximum value and a minimum value, said drum driving means including:

a. a guide component rotatable about a fixed axis,
  b. means to rotate said guide component,
  c. means providing a diametral groove in said component,
  d. a roller slidable in said groove,
  e. a revolving disc on which said roller is mounted close to the circumference of the disc, said roller being mounted for rotation about a fixed axis parallel to and displaced from the axis of rotation of the guide component, and f. the axis of rotation of the disc being displaced with respect to the axis of rotation of the component to drive the drum at the aforesaid variable speed, and E. means to render the grippers operative to grip a sheet when the drum is rotating at its minimum value and without stopping the drum.

2. A combination as set forth in claim 1 in which the feed drum together with the grippers are mounted for common rotation about a first shaft and in which said drum is fixed to a first sprocket that turns about the first shaft.

3. A combination as set forth in claim 2 in which a second shaft is provided which is driven at a variable speed by the disc, said second shaft carrying a second sprocket, and in which a chain is trained about the two sprockets so that the second sprocket and the drum are driven at a variable speed.

* * * * *